United States Patent [19]
Yokoyama et al.

[11] Patent Number: 5,391,691
[45] Date of Patent: Feb. 21, 1995

[54] PROCESS FOR PRODUCING AROMATIC POLYCARBONATE

[75] Inventors: Masuzo Yokoyama; Kazuhide Takakura; Junji Takano, all of Mie, Japan

[73] Assignee: Mitsubishi Petrochemical Co., Ltd., Tokyo, Japan

[21] Appl. No.: 139,848

[22] Filed: Oct. 22, 1993

[30] Foreign Application Priority Data

Oct. 23, 1992 [JP] Japan .................................. 4-285974
Nov. 13, 1992 [JP] Japan .................................. 4-303496

[51] Int. Cl.6 .............................................. C08G 64/00
[52] U.S. Cl. .................................... 528/198; 524/261; 524/267; 524/268; 524/611; 525/464; 528/196; 528/202; 528/125; 528/126; 528/171; 528/174
[58] Field of Search ............... 528/198, 196, 202, 125, 528/126, 171, 174; 524/261, 267, 268, 611; 525/464

[56] References Cited

U.S. PATENT DOCUMENTS 4,375,525 3/1983 Idel et al. ............................ 524/108
4,410,572 10/1983 Sasame et al. .................... 427/407.1

FOREIGN PATENT DOCUMENTS 0479107 9/1991 European Pat. Off. ...... C08G 64/08

Primary Examiner—John Kight, III
Assistant Examiner—Terressa Mosley
Attorney, Agent, or Firm—Sughrue, Mion, Zinn, Macpeak & Seas

[57] ABSTRACT

A process for producing an aromatic polycarbonate with improved heat resistance comprising melt polycondensing an aromatic diol compound and a carbonic acid diester compound in the presence of an interesterification catalyst and in the co-presence of an organosilicon compound.

19 Claims, No Drawings

PROCESS FOR PRODUCING AROMATIC POLYCARBONATE

FIELD OF THE INVENTION

This invention relates to a process for producing a polycarbonate by interesterification. More particularly, it relates to a process for producing an aromatic polycarbonate having improved heat resistance by melt polycondensation of an aromatic diol compound and a carbonic acid diester compound.

BACKGROUND OF THE INVENTION

Aromatic polycarbonates have excellent mechanical characteristics such as impact resistance as well as heat resistance and transparency and have been employed as engineering plastics in broad range fields, such as bottles for carbonated beverages, electronic bases (CD bases), transfer belts, etc.

Industrially established processes for producing an aromatic polycarbonate include the so-called phosgene process comprising reacting an aromatic diol, e.g., bisphenol, and phosgene by interfacial polycondensation. The phosgene process is advantageous because the resulting aromatic polycarbonate has a heat resistance as high as about 500° C. in terms of a heating temperature for 5% weight loss (Td5%) as hereinafter described.

However, the phosgene process which is currently carried out on an industrial scale has many disadvantages, such as high toxicity of phosgene, the necessity of handling of quantities of sodium chloride as a by-product, and fears of environmental pollution by methylene chloride which is usually used as a reaction solvent.

The so-called melt process or non-phosgene process is also well known and it consists of an interesterification reaction between an aromatic diol compound and a carbonic acid diester. The non-phosgene process is free of the above-mentioned problems associated with the phosgene process and also is more economical.

However, it is generally considered difficult to selectively obtain an aromatic polycarbonate having a high molecular weight and without any hydroxyl structure at the terminals thereof from, for example, bisphenol A and diphenyl carbonate, using the non-phosgene process. The presence of hydroxyl structure-terminated polymer molecules in an aromatic polycarbonate is considered as to be one of the reasons for a reduction in heat resistance. That is, as compared with the aromatic polycarbonate prepared by the phosgene process in which a hydroxyl terminal structure can be blocked out with ease, an aromatic polycarbonate prepared by the non-phosgene process is less heat resistant with a Td5% of 445° C. or lower.

Because molding of aromatic polycarbonates should be conducted at high temperatures of around 320° C. in order to lower melt viscosity thereof, low heat resistance of polycarbonates gives rise to problems such as cleavage of the polymer main chain, coloration, and reduction in mechanical strength. In particular, a high temperature is needed in molding to obtain thin-walled articles such as containers having a wall thickness of from 0.3 to 0.6 mm or articles with complicated shapes. Therefore, in order that an aromatic polycarbonate obtained by the non-phosgene process may be put to practical use, an improvement in heat resistance has been a keen demand.

SUMMARY OF THE INVENTION

An object of the present invention is to provide a non-phosgene process (i.e., an interesterification polycondensation process) for producing an aromatic polycarbonate having improved heat resistance.

The present invention provides a process for producing an aromatic polycarbonate comprising melt polycondensing an aromatic diol compound and a carbonic acid diester compound in the presence of a catalyst for interesterification, in which the melt polycondensing is also carried out in the co-presence of an organosilicon compound.

DETAILED DESCRIPTION OF THE INVENTION

The aromatic diol compound which can be used in the present invention is represented by the formula (V):

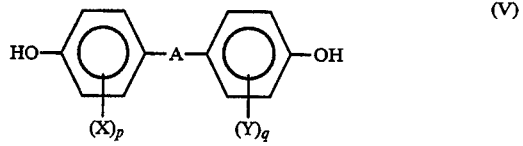

wherein A represents a divalent group selected from the group consisting of a simple bond, a substituted or unsubstituted, straight chain, branched or cyclic divalent hydrocarbon group having from 1 to 15 carbon atoms, —O—, —S—, —CO—, —SO—, and —SO$_2$—; X and Y, which may be the same or different, each represents a hydrogen atom, a halogen atom such as Cl or Br, or a hydrocarbon group having from 1 to 6 carbon atoms; and p and q each represents 0, 1 or 2.

Typical examples of aromatic diols represented by formula (V) include bisphenols, e.g., bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromo)propane, 4,4-bis(4-hydroxyphenyl)heptane, and 1,1-bis(4-hydroxyphenyl)cyclohexane; biphenols, e.g., 4,4'-dihydroxybiphenyl and 3,3',5,5'-tetramethyl-4,4'-biphenyl; bis(4-hydroxyphenyl)sulfone, bis(4-hydroxyphenyl) sulfide, bis(4-hydroxyphenyl) ether, and bis(4-hydroxyphenyl) ketone. 2,2-bis(4-Hydroxyphenyl)propane is preferred.

These aromatic diol compounds may be used either individually or as a combination of two or more thereof. In preparing a branched aromatic polycarbonate, a tri- or higher-hydric phenol may be copolymerized in a small proportion. For the purpose of improving heat stability or resistance of hydrolysis of the resulting aromatic polycarbonate, a monohydric phenol, such as p-t-butylphenol or p-cumylphenyl, may also be used in combination for blocking of a hydroxyl group at a terminal.

Typical examples of carbonic acid diesters which can be used in the present invention are dimethyl carbonate, diphenyl carbonate, ditolyl carbonate, bis(4-chlorophenyl) carbonate, and bis(2,4,6-trichlorophenyl) carbonate.

The carbonic acid diester compound is usually used in excess, preferably in an amount of from 1.01 to 1.30 mols, and more preferably from 1.02 to 1.20 mols, per mol of the aromatic diol compound.

Catalysts for interesterification which can be used in the present invention are well known. Typical examples therefor include acetates, carbonates, borates, nitrates, oxides, hydroxides, hydrides or alcoholates of alkali metals, e.g., lithium, sodium and potassium, alkaline earth metals, e.g., magnesium, calcium and barium, zinc, cadmium, tin, antimony, manganese, cobalt, nickel, titanium, zirconium, etc., with tin compounds being preferred. These catalysts for interesterification may be used either individually or as a combination of two or more thereof.

Specific examples of suitable catalysts which can be used are lithium hydride, lithium boron hydride, sodium boron hydride, potassium boron hydride, rubidium boron hydride, cesium boron hydride, beryllium boron hydride, magnesium boron hydride, calcium boron hydride, strontium boron hydride, barium boron hydride, aluminum boron hydride, phenoxy lithium, phenoxy sodium, phenoxy potassium, phenoxy rubidium, phenoxy cesium, sodium thiosulfate, beryllium oxide, magnesium oxide, tin (IV) oxide, dibutyltin oxide, dibutyltin laurate, beryllium hydroxide, magnesium hydroxide, germanium hydroxide, beryllium acetate, magnesium acetate, calcium acetate, tin (IV) acetate, germanium acetate, lithium carbonate, sodium carbonate, potassium carbonate, beryllium carbonate, magnesium carbonate, tin (IV) carbonate, germanium carbonate, tin (IV) nitrate, germanium nitrate, antimony trioxide, and bismuth trimethylcarboxylate.

The catalyst is used in an amount usually of from $10^{-5}$ to $10^{-1}$ mol, and preferably of from $10^{-5}$ to $10^{-2}$ mol, per mol of aromatic diol compound.

An important feature of the present invention resides in conducting the interesterification melt polycondensation reaction in the presence of an organosilicon compound.

The organosilicon compound used according to the present invention includes those having a partial structure represented by formulae (I) to (III):

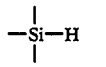
(I)

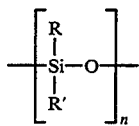
(II)

(III)

wherein R and R' each represents a hydrogen atom or a hydrocarbon group having from 1 to 20 carbon atoms; and n represents an integer of from 2 to 10,000; and those represented by formula (IV):

(IV)

wherein R" and R''' each represents a hydrocarbon group having from 1 to 20 carbon atoms; and m represents 0 or an integer of 1 to 3.

Organosilicon compounds having a partial structure represented by formula (I) are not particularly limited and include any organic compound having an Si—H bond. Such compounds may be a monomeric compound containing a single silicon atom or a polymeric compound including a polysiloxane composed of siloxane bond-linked units and polysilanes in which silicon atoms are directly bonded together. The polymeric structure may be linear or cyclic. The monomeric structures as well as the polymeric structures include those containing two or more Si—H bonds.

Specific examples of organosilicon compounds having a partial structure of the formula (I) are trimethylsilane, triethylsilane, diethylmethylsilane, tripropylsilane, butyl-dimethylsilane, trihexylsilane, triphenylsilane, diphenylmethylsilane, dimethylphenylsilane, methylphenylvinylsilane, aryldimethylsilane, dimethylethoxysilane, dimethoxymethylsilane, diethoxymethylsilane, trimethoxysilane, triethoxysilane, tri-n-pentyloxysilane, triphenoxysilane, diacetoxymethylsilane, dimethylaminosilane, diethylaminodimethylsilane, bis(dimethylamino)methylsilane, tris(dimethylamino)silane, diethylsilane, diphenylsilane, methylphenylsilane, diethoxysilane, octylsilane, phenylsilane, pentamethyldisiloxane, 1,1,3,3-tetramethyldisiloxane, 1,1,3,3,5,5-hexamethyltrisiloxane, 1,1,1,3,5,5,5-heptamethyltrisiloxane, 1,3,5,7,9-pentamethylcyclopentasiloxane, tris(trimethylsiloxy)silane, 1,1,1,3,5,7,7,7-octamethyltetrasiloxane, tetramethylcyclotetrasiloxane, pentamethylcyclopentasiloxane, methylhydrogenpolysiloxane, 1,4-bis(dimethylsilyl)benzene, and 1,1,3,3-tetramethyldisilazane. These compounds may be used either individually or as a combination thereof.

Of these organosilicon compounds, those which have a relatively high boiling point (150° C. or higher) and thereby are hardly volatilize under the conditions of use, and especially methylhydrogenpolysiloxane, triphenylsilane, and tri-n-pentyloxysilane, are preferred.

Specific examples of organosilicon compounds having a partial structure of the formula (II) are hexamethyldisiloxane, 1,3-diethyl-1,1,3,3-tetramethyldisiloxane, 1,3-divinyl-1,1,3,3-tetramethyldisiloxane, bis(1-methyl-3-silolenyl)oxide, 1,3-bis(3-hydroxypropyl)-1,1,3,3-tetramethyldisiloxane, 1,3-bis(2-aminoethylaminomethyl)-1,1,3,3-tetramethyldisiloxane, pentamethylpiperidinomethyldisiloxane, hexaethyldisiloxane, 1,3-dibutyl-1,1,3,3-tetramethyldisiloxane, 1,3-diphenyl-1,1,3,3-tetramethyldisiloxane, 1,3-bis(dioxanylethyl)-1,1,3,3-tetramethyldisiloxane, 1,3-bis(3-glycidoxypropyl)-1,1,3,3-tetramethyldisiloxane, hexapropyldisiloxane, 1,3-dimethyl-1,1,3,3-tetraphenyldisiloxane, hexamethylcyclotrisiloxane, octamethyltrisiloxane, 1,3,5-trimethyl-1,3,5-trivinylcyclotrisiloxane, 1,3,5-trimethyl-1,3,5-triphenylcyclotrisiloxane, octaphenylcyclotetrasiloxane, decamethylcyclopentasiloxane, hexaphenylcyclotrisiloxane, methylhydrogenpolysiloxane, dimethylpolysiloxane, ethylmethylpolysiloxane, methylphenylpolysiloxane, and diphenylpolysiloxane. Hexaphenylcyclotrisiloxane, octaphenylcyclotetrasiloxane, decamethylcyclopentasiloxane, dimethylpolysiloxane, and methylhydrogenpolysiloxane are preferred compounds.

Specific examples of organosilicon compounds having a partial structure of the formula (III) are methylsilanetriol, ethylsilanetriol, n-propylsilanetriol, isopropylsilanetriol, n-butylsilanetriol, phenylsilanetriol, methoxysilanetriol, ethoxysilanetriol, phenoxysilanetriol, trimethylsilanol, triphenylsilanol, dimethylsilanediol, tetramethyldisiloxane-1,3-diol, tetramethyldisilmethylene-1,3-diol, tetramethyldisilethylene-1,4- diol, 1,4-bis(hydroxydimethylsilyl)butane, triethylsilanol, diethylsilanediol, di-n-propylsilanediol, di-n-butylsilanediol, diisopropylsilanediol, diisobutylsilanediol, di-t-butylsilanediol, t-butyldimethylsilanol, methylphenylsilanediol, benzylvinylsilanediol, allylphenylsilanediol, allylbenzylsilanediol, bis(methylvinyl)disiloxanediol, bis(allylmethyl)disiloxanediol, bis(phenylvinyl)disiloxanediol, diphenylsilanediol, tetraphenyldisiloxane-1,3-diol, and hexaphenyltrisiloxane-1,5-diol. Those compounds which have a relatively high boiling point (150° C. or higher) and thereby hardly volatilize under the conditions of use, especially triphenylsilanol and diphenylsilanediol, are preferred of these compounds.

Specific examples of organosilicon compounds represented by the formula (IV) are tetramethoxysilane, tetraethoxysilane, tetra-n-propoxysilane, tetraisopropoxysilane, tetrabutoxysilane, tetraphenoxysilane, trimethylmethoxysilane, trimethylethoxysilane, cyclohexyloxytrimethylsilane, phenoxytrimethylsilane, dimethyldimethoxysilane, dimethyldiethoxysilane, diethoxydiethylsilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, methyltriethoxysilane, ethyltriethoxysilane, vinyltriethoxysilane, phenyltriethoxysilane, 2-norbornanemethyldimethoxysilane, cyclopentyltrimethoxysilane, and cyclopentyltriethoxysilane. Preferred compounds are tetraethoxysilane, diethoxydiethylsilane, and tetraphenoxysilane.

The organosilicon compounds may be used either individually or as a combination of two or more thereof. The organosilicon compounds are used in an amount sufficient for improving heat resistance of an aromatic polycarbonate obtained by interesterification melt polycondensation, which amount usually ranges from 0.5 to 500 mols, preferably from 1 to 300 mols, per mol of interesterification catalyst. The amount of the organosilicon compound(s) corresponds to $5 \times 10^{-5}$ to $5 \times 10^{-1}$ mol per mol of the aromatic diol compound.

The organosilicon compounds may be added at any stage during the interesterification melt polycondensation step as long as the effect of the present invention is achieved. Conveniently, they may be added at the beginning of the reaction together with the starting monomers (an aromatic diol compound and a carbonic acid diester compound) and a catalyst for interesterification. They may also be added during the final stage of the polycondensation reaction.

The interesterification melt polycondensation can be carried out in accordance with known melt polycondensation techniques for production of aromatic polycarbonates except that the organosilicon compound can be present at any stage of the reaction (see H. Schnell, *Chemistry and Physics of Polycarbonates*, Interscience (1964)).

In greater detail, the starting materials are subjected to melt polycondensation by interesterification under heating at atmospheric pressure or under reduced pressure while removing by-product produced. The reaction is usually effected through two or more stages. A first stage reaction is performed by heating the starting materials and the catalyst at 100° to 200° C. in an inert gas atmosphere under atmospheric pressure or under pressure. During this stage, an interesterification reaction and a reaction of formation of a low-molecular weight oligomer having a number average molecular weight of from 400 to 1,000 occur. To effect a second stage reaction, the reaction temperature is increased to 200° to 250° C., and the pressure is diminished, e.g., to 20 Torr or less, whereby the interesterification reaction, the formation of the low-molecular weight oligomer, and chain growth of the oligomer (to a number average molecular weight of from 1,000 to 7,000) are allowed to proceed while driving the alcohol or phenol by-produced out of the reaction system. For further chain growth of the oligomer, the alcohol or phenol and a carbonic acid diester are driven out of the system at a further increased temperature (e.g., 250° to 330° C.) under higher vacuum (e.g., 1 Torr or less) thereby to obtain a high-molecular weight aromatic polycarbonate.

The reaction time in each reaction stage is determined appropriately depending on the progress of the reaction. Upon consideration of the hue of the resulting polymer, while the hue is not appreciably affected by the length of the reaction time under temperatures around 200° C., the reaction time at a temperature of 200° C. or lower is usually from 0.5 to 5 hours, and the reaction time at an elevated temperature of from 200° to 250° C. is usually from 0.1 to 3 hours. At temperatures exceeding 250° C., a prolonged reaction adversely influences the hue. Accordingly, a recommended reaction time for the final reaction stage is within 1 hour, and particularly from 0.1 to 1 hour, with these parameters varying in relation to the molecular weight of the resulting polymer.

The organosilicon compound used according to the present invention is added at any of the above-mentioned reaction stages.

The aromatic polycarbonate obtained by the process of the present invention has a high molecular weight, namely a number average molecular weight (Mn) of from about 2,000 to about 30,000 and a weight average molecular weight (Mw) of from about 5,000 to about 70,000, with an Mw/Mn ratio preferably ranging from 2 to 4.

When the aromatic polycarbonate specifically weighing about 10 mg is heated in a nitrogen stream at a rate of temperature increase of 20° C./min using a thermogravimetric analyzer "200-TG/DTA 220" manufactured by Seiko Densi Kogyo Co., Ltd., the temperature at which the weight loss of the aromatic polycarbonate reaches 5% (based on the initial weight) is not less than 455° C., and preferably from 460° to 520° C. The above-identified temperature is taken as a heat resistance temperature and hereinafter is referred to as Td5%.

The hydroxyl group content of the resulting aromatic polycarbonate is preferably not more than about 0.2% by weight.

The present invention will now be illustrated in greater detail by way of the following Examples, but the present invention should not be construed as being limited thereto. Unless otherwise indicated herein, all parts, percents, ratios and the like are by weight.

Analysis of the aromatic polycarbonate obtained was conducted according to the following methods.
1) Hydroxyl Group Content The hydroxyl group (OH) content (wt %) of a polymer sample was obtained from the UV absorption spectrum according to the method of J. E. McGrath et al. (see *Polymer Preprints*, Vol. 19, No. 1, p. 494 (1978)).

2) Molecular Weight

Measured by gel-permeation chromatography in chloroform at 35° C. on polystyrene conversion.

EXAMPLE 1

In a 3 l-volume SUS-made reactor equipped with a stirrer and a distillation column were charged 228 g (1.0 mol) of bisphenol A, 231 g (1.08 mol) of diphenyl carbonate, and 50 mg (0.2 mmol) of dibutyltin oxide as a catalyst, and the mixture was kept in a molten state at 150° C. in a nitrogen atmosphere for 1 hour.

After the temperature was increased to 200° C., the pressure was gradually decreased to 20 Torr, and the reaction mixture was maintained under these conditions for 1 hour to distill off phenol. Then, the temperature was further increased to 250° C., and 150 mg of methylhydrogenpolysiloxane having a viscosity of 20 cps (corresponding to 2.5 mmol on the basis of a molecular weight reduction to the unit structure) was added thereto. The inner pressure was dropped to 0.5 Torr at the same temperature, and a polycondensation reaction was conducted for 1 hour to obtain about 250 g of a polymer.

The analytical results of the polymer obtained are shown in Table 1 below.

Comparative Example 1

A polymer was synthesized in the same manner as in Example 1, except no methylhydrogenpolysiloxane was used.

The analytical results of the polymer obtained are shown in Table 1 below.

EXAMPLES 2 AND 3

A polymer was synthesized in the same manner as in Example 1, except for changing the amount of the methylhydrogenpolysiloxane as shown in Table 1.

The analytical results of the polymer obtained are shown in Table 1 below.

EXAMPLE 4

A polymer was synthesized in the same manner as in Example 2, except for changing the time of addition of the methylhydrogenpolysiloxane. That is, the methylhydrogenpolysiloxane was added at the stage 45 minutes after the reaction conditions were changed to 250° C./0.5 Torr, and the reaction was further continued for 15 minutes under these conditions.

The resulting polymer had an Mw of 20,900, a hydroxyl group content of 0.153 wt %, and a Td5% of 475° C.

Comparative Examples 2 and 3

A polymer was synthesized in the same manner as in Comparative Example 1, except for using 35 mg (0.2 mmol) of calciumacetate (Comparative Example 2) or 1.4 mg (0.2 mmol) of lithium hydride (Comparative Example 3) as a catalyst for interesterification.

The analytical results of the polymer obtained are shown in Table 1 below. Both of the resulting polymers had low heat resistance.

EXAMPLE 5

A polymer was synthesized in the same manner as in Example 1, except for replacing dibutyltin oxide with 130 mg (0.2 mmol) of dibutyltin dilaurate.

The analytical results of the polymer obtained are shown in Table 1.

TABLE 1

| Example No. | Catalyst | Organosilicon Compound | | | Analytical Results of Polymer | | |
| --- | --- | --- | --- | --- | --- | --- | --- |
| | | Kind | Amount (mg(mmol)) | Si/Catalyst Molar Ratio | Mw | OH Content (wt %) | Td5% (°C.) |
| Example 1 | dibutyltin oxide | MHPS* | 150 (2.5) | 12.5 | 17,500 | 0.175 | 483 |
| Example 2 | dibutyltin oxide | " | 300 (5.0) | 25 | 17,800 | 0.115 | 482 |
| Example 3 | dibutyltin oxide | " | 600 (10) | 50 | 27,400 | 0.083 | 475 |
| Compar. Example 1 | dibutyltin oxide | — | — | — | 15,000 | 0.160 | 445 |
| Compar. Example 2 | calcium acetate | — | — | — | 20,100 | 0.014 | 419 |
| Compar. Example 3 | lithium hydride | — | — | — | 35,100 | 0.061 | 404 |
| Example 4 | dibutyltin oxide | MHPS | 300 (5.0) | 25 | 20,900 | 0.153 | 475 |
| Example 5 | dibutyltin dilaurate | " | 150 (2.5) | 12.5 | 22,300 | 0.056 | 476 |

Note: *Methylhydrogenpolysiloxane

EXAMPLE 6

A polymer was synthesized in the same manner as in Example 1, except for replacing methylhydrogenpolysiloxane with 2.6 g (10 mmol) of triphenylsilane.

The analytical results of the polymer obtained are shown in Table 2 below.

EXAMPLE 7

A polymer was synthesized in the same manner as in Example 6, except that the organosilicon compound was added at the same stage as in Example 5.

The analytical results of the polymer obtained are shown in Table 2 below.

EXAMPLE 8

A polymer was synthesized in the same manner as in Example 1, except for using 0.60 g (2.3 mmol) of triphenylsilane as an organosilicon compound and adding the organosilicon compound to the reaction mixture at the beginning of the reaction.

The analytical results of the polymer obtained are shown in Table 2.

TABLE 2

| Example No. | Organosilicon Compound | | | Analytical Results of Polymer | | |
|---|---|---|---|---|---|---|
| | Kind | Amount (g (mmol)) | Si/Catalyst Molar Ratio | Mw | OH Content (wt %) | Td5% (°C.) |
| 6 | tri-phenyl-silane | 2.6 (10) | 50 | 21,600 | 0.142 | 479 |
| 7 | tri-phenyl-silane | 2.6 (10) | 50 | 20,700 | 0.110 | 477 |
| 8 | tri-phenyl silane | 0.60 (2.3) | 11.5 | 17,400 | 0.102 | 471 |

EXAMPLES 9 TO 12

A polymer was synthesized in the same manner as in Example 1 or 8, except for using each of the organosilicon compounds shown in Table 3 below.

The analytical results of the polymer are shown in Table 3 below.

TABLE 3

| Example No. | Organosilicon Compound | | | | Analytical Results of Polymer | | |
|---|---|---|---|---|---|---|---|
| | Kind | Amount (g(mmol)) | Si/Catalyst Molar Ratio | Mode of Addition | Mw | OH Content (wt %) | Td5% (°C.) |
| 9 | diphenylsilane | 1.80 (10) | 50 | Example 1 | 20,900 | 0.096 | 472 |
| 10 | tri-n-pentyl-oxysilane | 2.90 (10) | 50 | Example 1 | 20,800 | 0.090 | 480 |
| 11 | trihexylsilane | 2.80 (10) | 50 | Example 8 | 23,200 | 0.082 | 465 |
| 12 | 1,4-bis(di-methylsilyl)-benzene | 1.90 (10) | 50 | Example 8 | 20,700 | 0.083 | 467 |

EXAMPLE 13

In a 3 l-volume SUS-made reactor equipped with a stirrer and a distillation column were charged 228 g (1.0 mol) of bisphenol A, 231 g (1.08 mol) of diphenyl carbonate and 50 mg (0.20 mmol) of dibutyltin oxide as a catalyst, and the mixture was kept in a molten state at 150° C. in a nitrogen atmosphere for 1 hour.

After the temperature was increased to 200° C., the pressure was gradually decreased to 20 Torr, and the reaction was continued for 1 hour to distill off phenol. Then, the temperature was further increased to 250° C., and 6.0 g (10 mmol) of hexaphenylcyclotrisiloxane was added thereto. The inner pressure was dropped to 0.5 Torr at the same temperature (250° C.), and a polycondensation reaction was conducted for 1 hour to obtain about 250 g of a polymer.

The analytical results of the polymer are shown in Table 4 below.

EXAMPLE 14

In a 3 l-volume SUS-made reactor equipped with a stirrer and a distillation column were charged 228 g (1.0 mol) of bisphenol A, 231 g (1.08 mol) of diphenyl carbonate, 6.0 g (10 mmol) of hexaphenylcyclotrisiloxane, and 50 mg (0.20 mmol) of dibutyltin oxide as a catalyst, and the mixture was kept in a molten state at 150° C. in a nitrogen atmosphere for 1 hour.

After the temperature was increased to 200° C., the pressure was gradually decreased to 20 Torr, and the reaction mixture was maintained under these conditions for 1 hour to distill off phenol. Then, the temperature was further increased to 250° C., the pressure was further reduced to 0.5 Torr, and a polycondensation reaction was conducted for 1 hour to obtain about 250 g of a polymer.

The analytical results of the polymer obtained are shown in Table 4 below.

EXAMPLE 15

In a 3 l-volume SUS-made reactor equipped with a stirrer and a distillation column were charged 228 g (1.0 mol) of bisphenol A, 231 g (1.08 mol) of diphenyl carbonate, 4.0 g (5 mmol) of octaphenylcyclotetrasiloxane, and 50 mg (0.20 mmol) of dibutyltin oxide as a catalyst, and the mixture was kept in a molten state at 150° C. in a nitrogen atmosphere for 1 hour.

After the temperature was increased to 200° C., the pressure was gradually reduced to 20 Torr, and the reaction mixture was maintained under these conditions for 1 hour to distill off phenol. Then, the temperature was further increased to 250° C., the inner pressure was decreased to 0.5 Torr, and a polycondensation reaction was conducted for 1 hour to obtain about 250 g of a polymer.

The analytical results of the polymer are shown in Table 4.

EXAMPLES 16 AND 17

A polymer was synthesized in the same manner as in Example 15, except for changing the amount of the octaphenylcyclotetrasiloxane as shown in Table 4 below.

The analytical results of the polymer obtained are shown in Table 4 below.

EXAMPLE 18

In a 3 l-volume SUS-made reactor equipped with a stirrer and a distillation column were charged 228 g (1.0 mol) of bisphenol A, 231 g (1.08 mol) of diphenyl carbonate, and 50 mg (0.20 mmol) of dibutyltin oxide as a catalyst, and the mixture was kept in a molten state at 150° C. in a nitrogen atmosphere for 1 hour.

After the temperature was increased to 200° C., the pressure was gradually decreased to 20 Torr, and the reaction mixture was maintained under these conditions for 1 hour to distill off phenol. Then, the temperature was further increased to 250° C., and 190 mg of dimethylpolysiloxane having a viscosity of 20 cps (corresponding to 2.5 mmol on the basis of a molecular weight reduction to the unit structure) was added thereto. The inner pressure was decreased to 0.5 Torr at the same temperature (250° C.), and a polycondensation reaction was conducted for hour to obtain about 250 g of a polymer.

The analytical results of the polymer obtained are shown in Table 4 below.

mixture was kept in a molten state at 150° C. in a nitrogen atmosphere for 1 hour.

TABLE 4

| Example No. | Catalyst | Organosilicon Compound | | | Analytical Results of Polymer | | |
|---|---|---|---|---|---|---|---|
| | | Kind | Amount (g(mmol)) | Si/Catalyst Molar Ratio | Mw | OH Content (wt %) | Td5% (°C.) |
| 13 | dibutyltin oxide | hexaphenyl-cyclotri-siloxane | 6.0 (10) | 50 | 28,500 | 0.096 | 480 |
| 14 | dibutyltin oxide | hexaphenyl-cyclotri-siloxane | 6.0 (10) | 50 | 19,700 | 0.174 | 473 |
| 15 | dibutyltin oxide | octaphenyl-cyclotetra-siloxane | 4.0 (5) | 25 | 18,000 | 0.077 | 473 |
| 16 | dibutyltin oxide | octaphenyl-cyclotetra-siloxane | 2.0 (2.5) | 12.5 | 19,800 | 0.075 | 472 |
| 17 | dibutyltin oxide | octaphenyl-cyclotetra-siloxane | 8.0 (10) | 50 | 21,600 | 0.064 | 467 |
| 18 | dibutyltin oxide | dimethyl-polysiloxane | 0.19 (2.5) | 12.5 | 13,400 | 0.113 | 472 |

EXAMPLE 19

In a 3 l-volume SUS-made reactor equipped with a stirrer and a distillation column were charged 228 g (1.0 mol) of bisphenol A, 231 g (1.08 mol) of diphenyl carbonate, 0.9 g (2.5 mmol) of decamethylcyclopentasiloxane, and 50 mg (0.20 mmol) of dibutyltin oxide as a catalyst, and the mixture was kept in a molten state at 150° C. in a nitrogen atmosphere for 1 hour.

After the temperature was increased to 200° C., the pressure was gradually decreased to 20 Torr, and the reaction mixture was maintained under these conditions for 1 hour to distill off phenol. Then, the temperature was further increased to 250° C., the inner pressure was dropped to 0.5 Torr at the same temperature, and a polycondensation reaction was conducted under these conditions for 1 hour to obtain about 250 g of a polymer.

The analytical results of the polymer obtained are shown in Table 5 below.

EXAMPLE 20

A polymer was synthesized in the same manner as in Example 15, except for using 130 mg (0.2 mmol) of dibutyltin dilaurate as a catalyst for interesterification.

The analytical results of the polymer obtained are shown in Table 5 below.

EXAMPLE 21

In a 3 l-volume SUS-made reactor equipped with a stirrer and a distillation column were charged 228 g (1.0 mol) of bisphenol A, 231 g (1.08 mol) of diphenyl carbonate, 2.2 g (10 mmol) of diphenylsilanediol, and 50 mg (0.20 mmol) of dibutyltin oxide as a catalyst, and the mixture was kept in a molten state at 150° C. in a nitrogen atmosphere for 1 hour.

After the temperature was increased to 200° C., the pressure was gradually decreased to 20 Torr, and the reaction mixture was maintained under these conditions for 1 hour to distill off phenol. Then, the temperature was further increased to 250° C., and the inner pressure was dropped to 0.5 Torr at the same temperature. A polycondensation reaction was conducted under these conditions for 1 hour to obtain about 250 g of a polymer.

The analytical results of the polymer obtained are shown in Table 6 below.

EXAMPLE 22

A polymer was synthesized in the same manner as in Example 21, except for changing the stage of addition of the diphenylsilanediol. That is, diphenylsilanediol was added to the reaction system when the reaction conditions were changed to 250° C./0.5 Torr, and the reaction was further continued under these conditions for 1 hour.

The analytical results of the polymer obtained are shown in Table 6 below.

EXAMPLE 23

A polymer was synthesized in the same manner as in Example 21, except for changing the stage of addition of the diphenylsilanediol. That is, diphenylsilanediol was added to the reaction system at the stage 45 minutes after the reaction conditions were changed to 250° C./0.5 Torr, and the reaction was further continued for 15 minutes under the same conditions.

TABLE 5

| Example No. | Catalyst | Organosilicon Compound | | | Analytical Results of Polymer | | |
|---|---|---|---|---|---|---|---|
| | | Kind | Amount (g(mmol)) | Si/Catalyst Molar Ratio | Mw | OH Content (wt %) | Td5% (°C.) |
| 19 | dibutyltin oxide | decamethyl-penta-siloxane | 0.90 (2.5) | 12.5 | 24,300 | 0.098 | 466 |
| 20 | dibutyltin dilaurate | octaphenyl-cyclotetra-siloxane | 4.0 (5) | 25 | 22,500 | 0.073 | 466 |

EXAMPLE 24

In a 3 1-volume SUS-made reactor equipped with a stirrer and a distillation column were charged 228 g (1.0 mol) of bisphenol A, 231 g (1.08 mol) of diphenyl carbonate, and 50 mg (0.20 mmol) of dibutyltin oxide as a catalyst, and the mixture was kept in a molten state at 150° C. in a nitrogen atmosphere for 1 hour.

After the temperature was increased to 200° C., the pressure was gradually diminished to 20 Torr, and the reaction mixture was maintained under these conditions for 1 hour to distill off phenol. Then, the temperature was further increased to 250° C., and 2.8 g (10 mmol) of triphenylsilanol was added thereto. The inner pressure was decreased to 0.5 Torr at the same temperature, and a polycondensation reaction was conducted under these conditions for 1 hour to obtain about 250 g of a polymer.

The analytical results of the polymer obtained are shown in Table 6 below.

EXAMPLE 25

A polymer was synthesized in the same manner as in Example 23, except for using the same kind and amount of the organosilicon compound as used in Example 24.

The analytical results of the polymer obtained are shown in Table 6 below.

EXAMPLE 26

A polymer was synthesized in the same manner as in Example 24, except for changing the amount of the triphenylsilanol as shown in Table 6.

The analytical results of the polymer obtained are shown in Table 6 below.

EXAMPLE 27

A polymer was synthesized in the same manner as in Example 22, except for using 130 mg (0.2 mmol) of dibutyltin dilaurate as a catalyst for interesterification.

The analytical results of the polymer obtained are shown in Table 6 below.

EXAMPLE 28

In a 3 1-volume SUS-made reactor equipped with a stirrer and a distillation column were charged 228 g (1.0 mol) of bisphenol A, 231 g (1.08 mol) of diphenyl carbonate, 2.0 g (10 mmol) of tetraethoxysilane, and 50 mg (0.20 mmol) of dibutyltin oxide as a catalyst, and the mixture was kept in a molten state at 150° C. in a nitrogen atmosphere for 1 hour.

After the temperature was increased to 200° C., the pressure was gradually decreased to 20 Torr, and the reaction mixture was maintained under these conditions for 1 hour to distill off phenol. Then, the temperature was further increased to 250° C., and the inner pressure was decreased to 0.5 Torr at the same temperature. A polycondensation reaction was conducted under these conditions for 1 hour to obtain about 250 g of a polymer.

The analytical results of the polymer obtained are shown in Table 7 below.

EXAMPLES 29 AND 30

A polymer was synthesized in the same manner as in Example 28, except for changing the amount of the tetraethoxysilane as shown in Table 7 below.

The analytical results of the polymer obtained are shown in Table 7 below.

Comparative Example 4

In order to prove that addition of an organosilicon compound after polymerization produces no effect in the present invention, the following procedures were carried out.

The polymer obtained in Comparative Example 1 (Td5%: 445° C.) was dried in vacuo at 120° C. for 6 hours. A 60 g of the dried polymer and 0.48 g of the organosilicon compound used in Example 28 (tetraethoxysilane) were melt-kneaded at 280° C. and 120 rpm for 5 minutes in a nitrogen stream using a Labo Plastomill manufactured by Toyo Seiki Co., Ltd. The resulting polymer had a Td5% of 440° C. as shown in Table 7.

It was thus proved that no improvement in heat resistance is produced when the organosilicon compound used in the present invention is added to a polymer at substantially the same Si/catalyst molar ratio as in Example 28 followed by melt-kneading.

TABLE 6

| Example No. | Catalyst | Organosilicon Compound Kind | Amount (g(mmol)) | Si/Catalyst Molar Ratio | Analytical Results of Polymer Mw | OH Content (wt %) | Td5% (°C.) |
| --- | --- | --- | --- | --- | --- | --- | --- |
| 21 | dibutyltin oxide | diphenyl-silanediol | 2.2 (10) | 50 | 17,000 | 0.099 | 479 |
| 22 | dibutyltin oxide | diphenyl-silanediol | 2.2 (10) | 50 | 22,600 | 0.045 | 478 |
| 23 | dibutyltin oxide | diphenyl-silanediol | 2.2 (10) | 50 | 24,000 | 0.062 | 474 |
| 24 | dibutyltin oxide | triphenyl-silanol | 2.8 (10) | 50 | 19,700 | 0.167 | 467 |
| 25 | dibutyltin oxide | triphenyl-silanol | 2.8 (10) | 50 | 21,700 | 0.097 | 474 |
| 26 | dibutyltin oxide | triphenyl-silanol | 1.49 (5) | 25 | 18,700 | 0.166 | 470 |
| 27 | dibutyltin dilaurate | diphenyl-silanediol | 2.2 (10) | 50 | 17,800 | 0.181 | 476 |

TABLE 7

| Example No. | Catalyst | Organosilicon Compound | | | Analytical Results of Polymer | | |
|---|---|---|---|---|---|---|---|
| | | Kind | Amount (g(mmol)) | Si/Catalyst Molar Ratio | Mw | OH Content (wt %) | Td5% (°C.) |
| Example 28 | dibutyltin oxide | tetraethoxy-silane | 2.0 (10) | 50 | 22,800 | 0.079 | 471 |
| Example 29 | dibutyltin oxide | tetraethoxy-silane | 1.0 (5) | 25 | 20,200 | 0.104 | 467 |
| Example 30 | dibutyltin oxide | tetraethoxy-silane | 0.5 (2.5) | 12.5 | 18,400 | 0.072 | 468 |
| Compar. Example 4 | dibutyltin oxide | tetraethoxy-silane | 0.48 (2.3) | 48 | — | — | 440 |

EXAMPLE 31

In a 3 l-volume SUS-made reactor equipped with a stirrer and a distillation column were charged 228 g (1.0 mol) of bisphenol A, 231 g (1.08 mol) of diphenyl carbonate, 4.0 g (22.2 mmol) of diethoxydiethylsilane, and 50 mg (0.20 mmol) of dibutyltin oxide as a catalyst, and the mixture was kept in a molten state at 150° C. in a nitrogen atmosphere for 1 hour.

After the temperature was increased to 200° C., the pressure was gradually diminished to 20 Torr, and the reaction mixture was maintained under these conditions for 1 hour to distill off phenol. Then, the temperature was further increased to 250° C., the inner pressure was decreased to 0.5 Torr, and a poly-condensation reaction conducted under these conditions for 1 hour to obtain about 250 g of a polymer.

The analytical results of the polymer obtained are shown in Table 8 below.

EXAMPLE 32

A polymer was synthesized in the same manner as in Example 31, except for changing the amount of diethoxydiethylsilane as shown in Table 8 below.

The analytical results of the polymer obtained are shown in Table 8 below.

EXAMPLE 33

In a 3 l-volume SUS-made reactor equipped with a stirrer and a distillation column were charged 228 g (1.0 mol) of bisphenol A, 231 g (1.08 mol) of diphenyl carbonate, 4.0 g (23.5 mmol) of phenoxytrimethylsilane, and 50 mg (0.20 mmol) of dibutyltin oxide as a catalyst, and the mixture was kept in a molten state at 150° C. in a nitrogen atmosphere for 1 hour.

After the temperature was increased to 200° C., the pressure was gradually decreased to 20 Torr, and the reaction mixture was maintained under these conditions for 1 hour to distill off phenol Then, the temperature was further increased to 250° C. the inner pressure was decreased to 0.5 Torr, and a poly-condensation reaction was conducted for 1 hour to obtain about 250 g of a polymer.

The analytical results of the polymer obtained are shown in Table 8 below.

EXAMPLE 34

A polymer was synthesized in the same manner as in Example 33, except for replacing phenoxytrimethylsilane with the same amount of cyclohexyloxytrimethylsilane.

The analytical results of the polymer obtained are shown in Table 8 below.

EXAMPLE 35

In a 3 l-volume SUS-made reactor equipped with a stirrer and a distillation column were charged 228 g (1.0 mol) of bisphenol A, 231 g (1.08 mol) of diphenyl carbonate, 1.0 g (2.5 mmol) of tetraphenoxysilane, and 50 mg (0.20 mmol) of dibutyltin oxide as a catalyst, and the mixture was kept in a molten state at 150° C. in a nitrogen atmosphere for 1 hour.

After the temperature was increased to 200° C., the pressure was gradually decreased to 20 Torr, and the reaction mixture was maintained under these conditions for 1 hour to distill off phenol. Then, the temperature was further increased to 250° C., and the inner pressure was dropped to 0.5 Torr. A polycondensation reaction was conducted under these conditions for 1 hour to obtain about 250 g of a polymer.

The analytical results of the polymer obtained are shown in Table 8 below.

EXAMPLE 36

A polymer was synthesized in the same manner as in Example 28, except for using 130 mg (0.2 mmol) of dibutyltin dilaurate as a catalyst for interesterification.

The analytical results of the polymer obtained are shown in Table 8 below.

TABLE 8

| Example No. | Catalyst | Organosilicon Compound | | | Analytical Results of Polymer | | |
|---|---|---|---|---|---|---|---|
| | | Kind | Amount (g(mmol)) | Si/Catalyst Molar Ratio | Mw | OH Content (wt %) | Td5% (°C.) |
| 31 | dibutyltin oxide | diethoxy-diethylsilane | 4 (22.2) | 111 | 23,600 | 0.111 | 466 |
| 32 | dibutyltin oxide | diethoxy-diethylsilane | 1.8 (10) | 50 | 9,300 | 0.260 | 465 |
| 33 | dibutyltin oxide | phenoxytri-methylsilane | 4 (23.5) | 118 | 19,300 | 0.136 | 467 |
| 34 | dibutyltin oxide | cyclohexyl-oxytri-methylsilane | 4 (23.5) | 118 | 19,100 | 0.135 | 471 |
| 35 | dibutyltin | tetraphenoxy- | 1 (2.5) | 12.5 | 15,000 | 0.180 | 467 |

TABLE 8-continued

| Example No. | Catalyst | Organosilicon Compound Kind | Amount (g(mmol)) | Si/Catalyst Molar Ratio | Analytical Results of Polymer Mw | OH Content (wt %) | Td5% (°C.) |
| --- | --- | --- | --- | --- | --- | --- | --- |
| 36 | oxide dibutyltin dilaurate | silane tetra- ethoxysilane | 2 (10) | 50 | 22,500 | 0.103 | 465 |

According to the present invention, in the production of an aromatic polycarbonate by melt polycondensation between an aromatic diol compound and a carbonic acid diester compound in the presence of a catalyst for interesterification, the presence of an organosilicon compound in the melt polycondensation reaction makes it possible to produce an aromatic polycarbonate with improved heat resistance without a great reduction in the hydroxyl group content at the molecule terminals of the polymer occurring.

While the invention has been described in detail and with reference to specific examples thereof, it will be apparent to one skilled in the art that various changes and modifications can be made therein without departing from the spirit and scope thereof.

What is claimed is:

1. A process for producing an aromatic polycarbonate having a 5% weight loss heating temperature (Td5%) of not lower than 460° C. comprising melt polycondensing an aromatic diol compound and a carbonic acid diester compound in the presence of an interesterification catalyst and in the co-presence of an organosilicon compound.

2. A process for producing an aromatic polycarbonate wherein said aromatic polycarbonate has a 5% weight loss heating temperature (Td5%) of not lower than 460° C. comprising melt polycondensing an aromatic diol compound and a carbonic acid diester compound in the presence of an interesterification catalyst and in the co-presence of an organosilicon compound, wherein said organosilicon compound is an organosilicon compound having a partial structure represented by formulae (I) to (III):

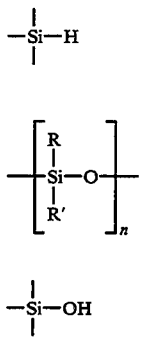

wherein R and R' each represents a hydrogen atom or a hydrocarbon group having from 1 to 20 carbon atoms; and n represents an integer of from 2 to 10,000.

3. A process for producing an aromatic polycarbonate wherein said aromatic polycarbonate has a 5% weight loss heating temperature (Td5%) of not lower than 460° C. comprising melt polycondensing an aromatic diol compound and a carbonic acid diester compound in the presence of an interesterification catalyst and in the co-presence of an organosilicon compound, wherein said organosilicon compound is a compound represented by formula (IV)

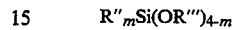

wherein R' and R''' each represents a hydrocarbon group having from 1 to 20 carbon atoms; and m represents 0 or an integer of 1 to 3.

4. A process as claimed in claim 2, wherein said organosilicon compound having a partial structure represented by formula (I) is selected from the group consisting of trimethylsilane, triethylsilane, diethylmethylsilane, tripropylsilane, butyldimethylsilane, trihexylsilane, triphenylsilane, diphenylmethylsilane, dimethylphenylsilane, methylphenylvinylsilane, aryldimethylsilane, dimethylethoxysilane, dimethoxymethylsilane, diethoxymethylsilane, trimethoxysilane, triethoxysilane, tri-n-pentyloxysilane, triphenoxysilane, diacetoxymethylsilane, dimethylaminosilane, diethylaminodimethylsilane, bis(dimethylamino)methylsilane, tris(dimethylamino)silane, diethylsilane, diphenylsilane, methylphenylsilane, diethoxysilane, octylsilane, phenylsilane, pentamethyldisiloxane, 1,1,3,3-tetramethyldisiloxane, 1,1,3,3,5,5-hexamethyltrisiloxane, 1,1,1,3,5,5,5-heptamethyltrisiloxane, 1,3,5,7,9-pentamethylcyclopentasiloxane, tris(trimethylsiloxy)silane, 1,1,1,3,5,7,7,7-octamethyltetrasiloxane, tetramethylcyclotetrasiloxane, pentamethylcyclopentasiloxane, methylhydrogenpolysiloxane, 1,4-bis(dimethylsilyl)benzene and 1,1,3,3-tetramethyldisilazane.

5. A process as claimed in claim 2, wherein said organosilicon compound having a partial structure represented by formula (II) is selected from the group consisting of hexamethyldisiloxane, 1,3-diethyl-1,1,3,3-tetramethyldisiloxane, 1,3-divinyl-1,1,3,3-tetramethyldisiloxane, bis(1-methyl-3-silolenyl)oxide, 1,3-bis(3-hydroxypropyl)-1,1,3,3-tetramethyldisiloxane, 1,3-bis(2-aminoethylaminomethyl)-1,1,3,3-tetramethyldisiloxane, pentamethylpiperidinomethyldisiloxane, hexaethyldisiloxane, 1,3-dibutyl-1,1,3,3-tetramethyldisiloxane, 1,3-diphenyl-1,1,3,3-tetramethyldisiloxane, 1,3-bis(dioxanylethyl)-1,1,3,3-tetramethyldisiloxane, 1,3-bis(3-glycidoxypropyl)-1,1,3,3-tetramethyldisiloxane, hexapropyldisiloxane, 1,3-dimethyl-1,1,3,3-tetraphenyldisiloxane, hexamethylcyclotrisiloxane, octamethyltrisiloxane, 1,3,5-trimethyl-1,3,5-trivinylcyclotrisiloxane, 1,3,5-trimethyl-1,3,5-triphenylcyclotrisiloxane, octaphenylcyclotetrasiloxane, decamethylcyclopentasiloxane, hexaphenylcyclotrisiloxane, dimethylpolysiloxane, ethylmethylpolysiloxane, methylphenylpolysiloxane and diphenylpolysiloxane.

6. A process as claimed in claim 2, wherein said organosilicon compound having a partial structure represented by formula (III) is selected from the group consisting of methylsilanetriol, ethylsilanetriol, n-propylsilanetriol, isopropylsilanetriol, n-butylsilanetriol, phenylsilanetriol, methoxysilanetriol, ethoxysilanetriol, phenoxysilanetriol, trimethylsilanol, triphenylsilanol, dimethylsilanediol, tetramethyldisiloxane-1,3-diol, tetramethyldisilmethylene-1,3-diol, tetramethyldisilethylene-1,4-diol, 1,4-bis(hydroxydimethylsilyl)butane, triethylsilanol, diethylsilanediol, di-n-propylsilanediol, di-n-butylsilanediol, diisopropylsilanediol, diisobutylsilanediol, di-t-butylsilanediol, t-butyldimethylsilanol, methylphenylsilanediol, benzylvinylsilanediol, allylphenylsilanediol, allylbenzylsilanediol, bis(methylvinyl)disiloxanediol, bis(allylmethyl)disiloxanediol, bis(phenylvinyl)disiloxanediol, diphenylsilanediol, tetraphenyldisiloxane-1,3-diol and hexaphenyltrisiloxane-1,5-diol.

7. A process as claimed in claim 3, wherein said organosilicon compound represented by formula (IV) is selected from the group consisting of tetramethoxysilane, tetraethoxysilane, tetra-n-propoxysilane, tetraisopropoxysilane, tetrabutoxysilane, tetraphenoxysilane, trimethylmethoxysilane, trimethylethoxysilane, cyclohexyloxytrimethylsilane, phenoxytrimethylsilane, dimethyldimethoxysilane, dimethyldiethoxysilane, diethoxydiethylsilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, methyltriethoxysilane, ethyltriethoxysilane, vinyltriethoxysilane, phenyltriethoxysilane, 2-norbornanemethyldimethoxysilane, cyclopentyltrimethoxysilane and cyclopentyltriethoxysilane.

8. A process as claimed in claim 2 or 3, wherein said organosilicon compound is selected from the group consisting of methylhydrogenpolysiloxane, triphenylsilane, tri-n-pentyloxysilane, diphenylsilane, 1,4-bis(dimethylsilyl)benzene, hexaphenylcyclotrisiloxane, octaphenylcyclotetrasiloxane, decamethylcyclopentasiloxane, dimethylpolysiloxane, phenoxytrimethylsilane, tetraethoxysilane, cyclohexyloxytrimethylsilane, diethoxydiethylsilane, tetraphenoxysilane, diphenylsilanediol and triphenylsilanol.

9. A process as claimed in claim 2 or 3, wherein said organosilicon compound is present in an amount of from 0.5 to 500 mols per mol of the interesterification catalyst.

10. A process as claimed in claim 2 or 3, wherein said organosilicon compound is present in an amount of from $5 \times 10^{-5}$ to $5 \times 10^{-1}$ mol per mol of the aromatic diol compound.

11. A process as claimed in claim 2 or 3, wherein said aromatic diol compound is a compound represented by formula (V):

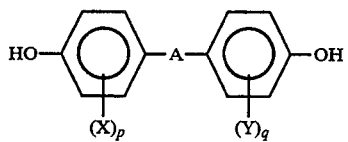

(V)

wherein A represents a single bond or a divalent group selected from the group consisting of a substituted or unsubstituted, straight chain, branched or cyclic divalent hydrocarbon group having from 1 to 15 carbon atoms, —O—, —S—, —CO—, —SO—, and —SO$_2$—; X and Y, which are the same or different, each represents a hydrogen atom, a halogen atom or a hydrocarbon group having from 1 to 6 carbon atoms; and p and q each represents 0, 1 or 2.

12. A process as claimed in claim 11, wherein said aromatic diol compound is selected from the group consisting of bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromo)propane, 4,4-bis(4-hydroxyphenyl)heptane, 1,1-bis(4-hydroxyphenyl)cyclohexane, 4,4'-dihydroxybiphenyl, 3,3',5,5'-tetramethyl-4,4'-biphenyl, bis(4-hydroxyphenyl)sulfone, bis(4-hydroxyphenyl) sulfide, bis(4-hydroxyphenyl) ether and bis(4-hydroxyphenyl) ketone.

13. A process as claimed in claim 2 or 3, wherein said carbonic acid diester compound is selected from the group consisting of dimethyl carbonate, diphenyl carbonate, ditolyl carbonate, bis(4-chlorophenyl) carbonate and bis(2,4,6-trichlorophenyl) carbonate.

14. A process as claimed in claim 2 or 3, wherein said carbonic acid diester compound is present in an amount of from 1.01 to 1.30 mols per mol of the aromatic diol compound.

15. A process as claimed in claim 2 or 3, wherein said interesterification catalyst is selected from the group consisting of lithium hydride, lithium boron hydride, sodium boron hydride, potassium boron hydride, rubidium boron hydride, cesium boron hydride, beryllium boron hydride, magnesium boron hydride, calcium boron hydride, strontium boron hydride, barium boron hydride, aluminum boron hydride, phenoxy lithium, phenoxy sodium, phenoxy potassium, phenoxy rubidium, phenoxy cesium, sodium thiosulfate, beryllium oxide, magnesium oxide, tin (IV) oxide, dibutyltin oxide, dibutyltin laurate, beryllium hydroxide, magnesium hydroxide, germanium hydroxide, beryllium acetate, magnesium acetate, calcium acetate, tin (IV) acetate, germanium , acetate, lithium carbonate, sodium carbonate, potassium carbonate, beryllium carbonate, magnesium carbonate, tin (IV) carbonate, germanium carbonate, tin (IV) nitrate, germanium nitrate, antimony trioxide and bismuth trimethylcarboxylate.

16. A process as claimed in claim 1, wherein said catalyst for interesterification is present in an amount of from $10^{-5}$ to $10^{-1}$ mol per mol of the aromatic diol compound.

17. A process as claimed in claim 2, wherein said melt polycondensing comprises:

in a first step, heating a reaction system comprising 1 mol of the aromatic diol compound, from 1.01 to 1.30 mols of the carbonic acid diester compound, from $10^{-5}$ to $10^{-1}$ mol of the interesterification catalyst, and from 0.5 to 500 mols, per mol of the interesterification catalyst, of the organosilicon compound at a temperature of from 100° to 200° C. for a period of from 0.5 to 5 hours to form a low-molecular weight oligomer having a number average molecular weight of from 400 to 1,000 by interesterification, in a second step, continuing the reaction at an elevated temperature ranging from 200° to 250° C. under reduced pressure higher than 1 Torr and not higher than 20 Torr for a period of from 0.1 to 3 hours to allow the interesterification reaction, the formation of the low-molecular weight oligomer, and chain growth of the oligomer to proceed while driving by-produced alcohol or phenol out of the reaction system thereby to obtain an aromatic polycarbonate having a number average molecular weight of from 1,000 to 7,000; and in a third step, further continuing the reaction at a further elevated temperature ranging from 250° to 330° C. under further reduced pressure of not higher than 1 Torr for a period of from 0.1 to 1 hour to drive by-produced alcohol or phenol and carbonic acid diester out of the reaction system thereby to obtain an aromatic polycarbonate having a number average molecular weight of from about 2,000 to about 30,000 and a weight average molecular weight of from about 5,000 to about 70,000.

18. A process as claimed in claim 2, wherein said melt polycondensing comprises:

in a first step, heating a reaction system comprising 1 mol of the aromatic diol compound, from 1.01 to 1.30 mols of the carbonic acid diester compound and from $10^{-5}$ to $10^{-1}$ mol of the interesterification catalyst at a temperature of from 100° to 200° C. for a period of from 0.5 to 5 hours to form a low-molecular weight oligomer having a number average molecular weight of from 400 to 1,000 by interesterification, in a second step, adding from 0.5 to 500 mols, per mol of the interesterification catalyst, of the organosilicon compound to the reaction system, and continuing the reaction at an elevated temperature ranging from 200° to 250° C. under reduced pressure higher than 1 Torr and not higher than 20 Torr for a period of from 0.1 to 3 hours to allow the interesterification reaction, the formation of the low-molecular weight oligomer, and chain growth of the oligomer to proceed while driving by-produced alcohol or phenol out of the reaction system thereby to obtain an aromatic polycarbonate having a number average molecular weight of from 1,000 to 7,000; and in a third step, further continuing the reaction at a further elevated temperature ranging from 250° to 330° C. under further reduced pressure of not higher than 1 Torr for a period of from 0.1 to 1 hour to drive by-produced alcohol or phenol and carbonic acid diester out of the reaction system thereto to obtain an aromatic polycarbonate having a number average molecular weight of from about 2,000 to about 30,000 and a weight average molecular weight of from about 5,000 to about 70,000.

19. A process as claimed in claim 2, wherein said melt polycondensing comprises:

in a first step, heating a reaction system comprising 1 mol of the aromatic diol compound, from 1.01 to 1.30 mols of the carbonic acid diester compound and from $10^{-5}$ to $10^{-1}$ mol of the interesterification catalyst at a temperature of from 100° to 200° C. for a period of from 0.5 to 5 hours to form a low-molecular weight oligomer having a number average molecular weight of from 400 to 1,000 by interesterification, in a second step, continuing the reaction at an elevated temperature ranging from 200° to 250° C. under reduced pressure higher than 1 Torr and not higher than 20 Torr for a period of from 0.1 to 3 hours to allow the interesterification reaction, the formation of the low-molecular weight oligomer, and chain growth of the oligomer to proceed while driving by-produced alcohol or phenol out of the reaction system thereby to obtain an aromatic polycarbonate having a number average molecular weight of from 1,000 to 7,000; and in a third step, adding from 0.5 to 500 mols, per mol of the interesterification catalyst, of the organosilicon compound to the reaction system, and further continuing the reaction at a further elevated temperature ranging from 250° to 330° C. under further reduced pressure of not higher than 1 Torr for a period of from 0.1 to 1 hour to drive by-produced alcohol or phenol and carbonic acid diester out of the reaction system thereby to obtain an aromatic polycarbonate having a number average molecular weight of from about 2,000 to about 30,000 and a weight average molecular weight of from about 5,000 to about 70,000.

* * * * *